Patented July 12, 1938

2,123,634

UNITED STATES PATENT OFFICE

2,123,634

AZO COMPOUNDS

Fritz Mietzsch and Josef Klarer, Wuppertal-Elberfeld, Germany, assignors to Winthrop Chemical Company, Inc., New York, N. Y., a corporation of New York No Drawing. Application January 29, 1937, Serial No. 122,981. In Germany April 18, 1934

11 Claims. (Cl. 260—92)

This invention relates to azo compounds which display a bactericidal action, and to a process of preparing the same.

U. S. Patent No. 2,085,037, June 29, 1937, refers to the manufacture of azo compounds displaying a bactericidal action, which azo compounds have the general formula:

$$R^1-N=N-R^2$$

wherein $R^1$ stands for a para-sulfamide or disulfamide substituted radical of the benzene series and $R^2$ stands for a cyclic radical containing nitrogen in basic linkage, that is for an aminobenzene or aminonaphthalene radical which contains at least one further basic nitrogen atom in the form of an amino or alkylamino group. Acid groups should not be present in the said azo compounds since it has been found that the bactericidal activity of the azo compounds specified is reduced to a far-reaching extent by the presence of acid groups. For instance, the 2,4-diaminoazobenzene-4'-sulfonic acid amide becomes inactive by the introduction of a carboxylic acid group in the 2'-position. This behaviour of the said azo compounds was disadvantageous in so far as a greater solubility of the said azo compounds was desired for their parenteral administration, whereas the introduction of acid groups is known as a medium which is suitable to effect a greater solubility of a chemical compound. For the above-mentioned reason first it appeared necessary in the present case to take other ways in order to effect an increase of the solubility of the azo compounds specified above. However, we have made the surprising discovery that the introduction of acid groups into the azo compounds mentioned does not in every case reduce their bactericidal activity. Rather, products of increased solubility and maintained bactericidal activity are obtained if acid groups are introduced into that radical of the azo compounds which contains the basic nitrogen atoms. The cyclic radical containing the acid group and the basic nitrogen atoms, but only this radical, may also contain a hydroxyl group instead of one basic nitrogen atom. Regarding the activity and solubility it is immaterial whether the free acid group is present in the form of nucleo-bound sulfonic or carboxylic groups, or whether these groups are bound by means of intermediate members, for instance, aminomethane sulfonic acid, aminoacetic, hydroxy acetic, aminoethane sulfonic acid and other radicals may be introduced to effect an increased solubility. The amino or hydroxyl groups which are characteristic substituents of the one radical attached to the azo group may serve as intermediate members. Accordingly, new products which display a considerable bactericidal activity and a good solubility in water are obtainable by the manufacture of azo compounds of the formula:

$$R^1-N=N-R^2$$

wherein $R^1$ stands for a cyclic radical selected from the group consisting of para-sulfamide and disulfamide substituted radicals of the benzene series, in which radical the amino group of the sulfamide groups may be substituted by alkyl groups or an alkylene group, and wherein $R^2$ stands for a cyclic radical containing nitrogen selected from the group consisting of aminobenzene and aminonaphthalene radicals, which radicals contain at least one further basic nitrogen atom in the form of an amino- or alkyl-amino group or contain at least one hydroxyl group and further contain at least one acid group which may be a substituent of the amino or hydroxyl group. In these compounds the amido group attached to the sulfonic acid group(s) may be a primary, secondary or tertiary amido group. It may be substituted by alkyl groups, such as methyl, ethyl, propyl and butyl, or by an alkylene group, such as the tetramethylene and pentamethylene group, in which case the amido group forms a pyrrolidyl or piperidyl nucleus. However, it may be expressly stated that hydroxyalkyl groups should not be present since they strongly reduce the bactericidal activity contrary to the other substituents. The benzene radical bearing the sulfonic acid amide group(s) may contain further substituents, for instance, alkyl groups, such as methyl and ethyl, but free acid groups should not be present in this radical.

The amino group which is present in the other radical attached to the azo group may be substituted by alkyl groups, such as methyl, ethyl and butyl groups, by acyl groups, such as the acetyl, benzoyl, amino acetyl, amino benzoyl, carbamic acid, the guanyl and biguanyl radical without the bactericidal activity of the azo compounds being substantially affected. Correspondingly, the term "amino" when used in the appended claims is intended to include also such substituted amino groups. The amino group may also be used as a member to connect two molecules of the azo compounds specified by means of the carbonyl or carbimido group, so that a urea-like or guanidine-like linkage is produced.

The free acid group which is preferably a sulfonic acid or carboxylic acid group may be present once or several times. In view of the presence of the acid groups the new azo compounds are capable of forming salts with bases, such as the alkali and alkaline-earth metal bases, for instance, calcium-, strontium-, magnesium-, sodium-, potassium- and lithium-hydroxide or carbonate, or with ammonia or amine bases, such as diethylamine, dihydroxyethylamine, ethylenediamine, diethylaminoethanol, piperidine and piperazine.

In accordance with the present invention the new azo compounds specified above are obtainable by reacting upon a cyclic nitrogenous compound selected from the group consisting of aminobenzene and aminonaphthalene compounds which contain at least one further nitrogen atom in the form of an amino or alkylamino group or at least one hydroxyl group, and further contain at least one acid group which may be a substituent of the amino or hydroxyl group, with a diazo compound selected from the group consisting of para-sulfamide and disulfamide substituted diazo compounds of the benzene series in which the amino group of the sulfamide group may be substituted by alkyl groups or by an alkylene group. The reaction is advantageously carried out in the presence of water at a low temperature, say at about 20° C. or below.

The azo compounds thus obtainable are colored powders which in the form of their alkali or alkaline-earth metal, ammonium or amine salts in general are soluble in water. In view of their considerable bactericidal activity they have proved active in the treatment of infectious diseases.

The invention is further illustrated by the following examples without being restricted thereto:

*Example 1.*—20.8 grams of the hydrochloride of 4-aminobenzenesulfonic acid amide are dissolved in 100 ccs. of water and after the addition of 15 ccs. of concentrated hydrochloric acid diazotized with a solution of 6.9 grams of sodium nitrite in water. A solution of 18.8 grams of 1,3-phenylenediamine-4-sulfonic acid with 40 grams of sodium acetate dissolved in water is added to this diazo solution. The 2.4-diaminoazobenzene-5-sulfonic acid-4'-sulfonic acid amide precipitates immediately as a brownish red precipitate. It is sucked off and obtained from water in the form of brown needles which are readily soluble in alkalies with a yellowish red coloration.

By heating the free sulfonic acid with excess ammonia or diethylamine and by the addition of ether the ammonium, the diethylamine salt respectively, are obtained. The yellow red salts are readily soluble in water. By heating the free sulfonic acid with ethylene diamine and distilling off the excess ethylene diamine in vacuo the ethylene diamine salt is obtained in the form of an orange red powder which is readily soluble in water. By heating the free acid with piperazine and by the addition of acetone the orange red readily soluble piperazine salt is obtained. By heating the free acid with one equivalent of diethanolamine the diethanolamine salt is obtained.

*Example 2.*—20.8 grams of the hydrochloride of 4-aminobenzene sulfonic acid amide are diazotized as indicated in Example 1 and treated with an alkaline solution of 18.9 grams of 3-aminophenol-6-sulfonic acid. The azo compound is obtained as a brown precipitate from the yellowish red solution by means of dilute hydrochloric acid. The precipitate is dissolved in dilute sodium carbonate solution while gently heating. By the addition of acetic acid and sodium chloride solution the 2-amino-4-hydroxylazobenzene-5-sulfonic acid-4'-sulfonic acid amide is precipitated as an olive green colored powder. It is readily soluble in water with an olive green coloration, in sodium carbonate solution with an orange yellow coloration. The azo compound is precipitated by means of hydrochloric acid.

In this example the 3-aminophenol-6-sulfonic acid may be replaced by 23.1 grams of 3-acetyl-aminophenol-6-sulfonic acid. Thus the 2-acetyl-amino-4-hydroxyazobenzene-5-sulfonic acid - 4'-sulfonic acid amide is obtained as a water-soluble yellow red powder; or the 3-aminophenol-6-sulfonic acid may be replaced by 20.2 grams of the symmetric urea compound from 3-aminophenol-6-sulfonic acid. A brownish yellow azo compound which is soluble in water with a brownish yellow and in dilute caustic soda solution with an orange coloration is thus obtained which is precipitated by excess caustic soda solution in the form of the sodium salt. It has the formula:

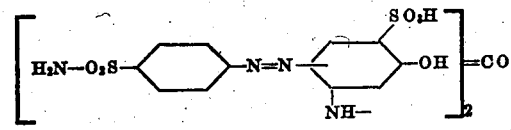

Further, the 3-aminophenol-6-sulfonic acid may be replaced by 22.3 grams of symmetric guanide of the 3-aminophenol-6-sulfonic acid. Thus a brown azo compound is obtained which is soluble in water with a yellowish brown, in caustic soda solution with a yellowish red coloration; the product corresponds to the aforementioned formula, but instead of the CO= group stands the =C=NH group.

The 3-aminophenol-6-sulfonic acid may also be replaced by 23.5 grams of the condensation product from 1 mol. of cyanuric chloride, 2 mols of 3-aminophenol-6-sulfonic acid and 1 mol. of ammonia (a white readily soluble powder in dilute alkalies). A yellow brown azo compound which can be precipitated from an aqueous solution by means of sodium chloride or alcohol is thus obtained. The azo compound is soluble in alkalies with a yellow red coloration.

Or the 3-aminophenol-6-sulfonic acid may be replaced by 23.4 grams of the condensation product from 1 mol. of 2.6-dichloro-4-methylpyrimidine and 2 mols of the 3-aminophenol-6-sulfonic acid (white, water-soluble powder). Thus a brown azo compound is obtained which can be precipitated from the yellow colored aqueous solution by means of sodium chloride solution. By means of alkalies the yellow color turns to yellow red. It has the probable formula:

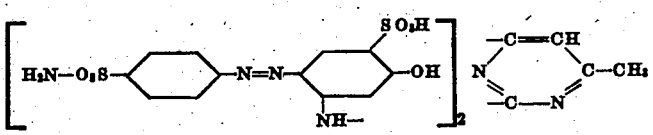

*Example 3.*—17.2 grams of 4-aminobenzenesulfonic acid amide are dissolved in 25 ccs. of concentrated hydrochloric acid and water and diazotized with 6.9 grams of sodium nitrite. The diazo solution is added to a solution of 16.6 grams of 3-aminophenylglycine in sodium acetate solution, whereupon the dyestuff first precipitates in an oily form but solidifies to crystals on the addition of ice water. The 4'-sulfonic acid amide-phenyl-azo-3-amidophenylglycine obtained in this manner is dissolved in sodium bicarbonate for purification and reprecipitated with dilute acetic acid. The red-brown crystal powder melts at 189° C. and dissolves in caustic soda solution and sodium carbonate solution with red-brown coloration.

Example 4.—20.8 grams of the hydrochloride of 4-aminobenzenesulfonic acid amide are diazotized as specified above and coupled with 26.2 grams of the sodium salt of 2-amino-5-naphthol-7-sulfonic acid in alkaline solution. The 2-amino-5-naphthol-7-sulfonic acid-azophenyl-4-sulfonic acid amide is obtained as a red brown precipitate from the dark red solution by the addition of hydrochloric acid. The precipitate is dissolved in dilute sodium carbonate solution and separated again by means of hydrochloric acid. The compound is readily soluble in alkalies with a red coloration.

The sodium salt of 2-amino-5-naphthol-7-sulfonic acid may be replaced by 28.2 grams of 2-acetylamino-5-naphthol-7-sulfonic acid. Thus a brown red azo compound is obtained which is soluble in water with a yellow red, in alkalies with a cherry red coloration; or by 35.8 grams of 2-(m-aminobenzoyl-amino)-5-naphthol-7-sulfonic acid. Thus a red brown azo compound is obtained which is soluble in alkalies with a dark red coloration; or by 28.3 grams of 2-ureido-5-naphthol-7-sulfonic acid. Thus a brick red azo compound is obtained which is soluble in water with a yellow red, in caustic soda solution with a red coloration; or by 32.4 grams of 2-biguanide-5-naphthol-7-sulfonic acid. A brown red azo compound is obtained which is soluble in alkalies with a red coloration; from this solution the sodium salt may be obtained as red brown precipitate which is readily soluble in water by means of sodium chloride or acetone; or by 29.6 grams of 2-glycinamide-5-naphthol-7-sulfonic acid. A brown azo compound which is soluble in acetic acid with a brown, and in dilute caustic soda solution with a red coloration is thus obtained; or by 25.3 grams of 2-methylamino-5-naphthol-7-sulfonic acid. A red brown azo compound which is readily soluble in water with the same coloration is thus obtained. By means of caustic soda solution the color turns to red. The compound is soluble in methyl alcohol; or by 29.5 grams of 2-diethylamino-5-naphthol-7-sulfonic acid. A green brown azo compound which is readily soluble in water and methyl alcohol with a red brown coloration is thus obtained. The aqueous solution is colored carmine red by means of caustic soda solution; or by 23 grams of 5.5'-dihydroxy-2.2'-dinaphthylamine-7.7'-disulfonic acid. A black brown azo compound is thus obtained. The solution in water takes a cherry red coloration, in caustic soda solution a carmine red coloration; or by 25.2 grams of the symmetric urea compound of the 2-amino-5-naphthol-7-sulfonic acid. Thus a brown azo compound is obtained which is soluble in sodium carbonate solution with a brown red coloration. From this solution the sodium salt may be precipitated as brown red precipitate by means of alcohol; or by 26 grams of symmetric thiourea of the 2-amino-5-naphthol-7-sulfonic acid. Thus a brown red compound is obtained which is soluble in alkalies with a blood red coloration; or by 25.1 grams of symmetric guanide of the 2-amino-5-naphthol-7-sulfonic acid. A red brown azo compound is obtained which is soluble as sodium salt with a yellow red coloration and which can be precipitated by means of sodium chloride; or by 23.9 grams of 2-amino-8-hydroxynaphthalene-6-sulfonic acid. A dark brown azo compound which is soluble in caustic soda solution with a deep red coloration is thus obtained; or by 28.2 grams of 2-acetylamino-8-hydroxynaphthalene-6-sulfonic acid. Thus a red brown azo compound is obtained which is soluble in acid solution with a yellow red coloration, in caustic soda solution with a dark red coloration; or by 36.1 grams of 2-acetylamino-8-naphthol-3,6-disulfonic acid. Thus a red brown azo compound is obtained which is soluble in acid solution with a red, and in caustic soda solution with a brown red coloration; or by 42.3 grams of 1-benzoylamino-8-naphthol-4,6-disulfonic acid. A red brown azo compound is thus obtained which is soluble in acid solution with rhodamin red, and in caustic alkali solution with a yellow red coloration; or by 32.8 grams of 1,8-perimidine-3,6-disulfonic acid of the formula:

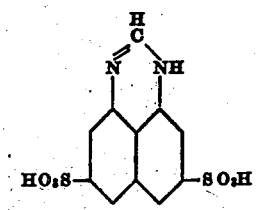

A violet red azo compound is obtained which is soluble in dilute mineral acid with weak brown, in caustic soda solution with strong blue coloration; or by 37.2 grams of 4'-aminophenyl-5-hydroxynaphtho-1,2-thiazole-7-sulfonic acid of the formula:

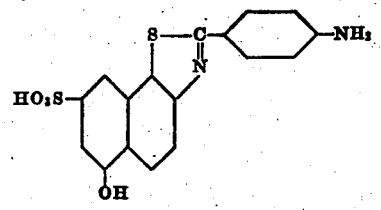

A black brown azo compound is obtained which is soluble in caustic soda solution with a carmine red coloration; or by 34.8 grams of the condensation product from one mol. of cyanuric chloride, 1 mol. of 2-amino-5-naphthol-7-sulfonic acid and 2 mols of ammonia. A red brown azo compound is thus obtained which is soluble in sodium carbonate with an orange, and in caustic soda solution with blood red coloration.

Example 5.—29.1 grams of 2,4-diaminoazobenzene-4'-sulfonic acid amide are suspended in 90 ccs. of ethyleneglycol and heated with 13.4 grams of sodium formaldehyde bisulfite on the water bath while stirring until the whole mixture is dissolved and a test portion when poured into water remains clear. The solution is then poured into alcohol, the sodium salt of the 2,4-diaminoazobenzene-di-N-methane-sulfonic acid-4'-sulfonic acid amide is filtered with suction and washed with alcohol. The compound has a yellow red coloration and is readily soluble in water. It is decomposed by means of hydrochloric acid while evolving sulfur dioxide and separating the original azo compound.

In the same manner 29.2 grams of 2-amino-4-hydroxyazobenzene-4'-sulfonic acid amide melting at 106° C. are treated. The sodium salt of the 2-amino-4-hydroxyazobenzene-N-methanesulfonic acid-4'-sulfonic acid amide is obtained as a light brown powder which is readily soluble in water. It is decomposed with hydrochloric acid.

Example 6.—17.2 grams of 4-aminobenzenesulfonic acid-amide are dissolved in 25 ccs. of concentrated hydrochloric acid while adding water and diazotized with a solution of 6.9 grams of sodium nitrite in water. The diazo solution is added drop by drop to a solution of 20.3 grams of 6-amino-2-hydroxy-3-naphthoic acid in 400 ccs. of 10% sodium carbonate solution and the azo compound formed salted out after stirring for one hour and adding 150 grams of sodium chloride. The separated brown violet dyestuff is filtered with suction, washed with sodium chloride solution, dissolved in warm water and again salted out. From the aqueous solution of the dyestuff purified in this manner the free 4'-sulfonic acid amide-phenylazo-6-amino-2-hydroxy-3-naphthoic acid separates as a brown violet precipitate with 10% acetic acid. It dissolves in dilute caustic soda solution with pure violet, in sodium carbonate solution with brown violet coloration. In 30% acetic acid it is only slightly soluble when cold, on heating it dissolves with a brown coloration. Concentrated hydrochloric acid takes up the dyestuff with violet red, concentrated sulfuric acid with brownish red coloration.

Example 7.—30.7 grams of 1-aminobenzene-3,5-di-(sulfonic acid dimethylamide) melting at 182° C., in 150 ccs. of acetic acid, 50 ccs. of water and 25 ccs. of concentrated hydrochloric acid are diazotized with a solution of 6.9 grams of sodium nitrite in water. The diazo solution is added to a strongly soda alkaline solution of 36.1 grams of 1-acetylamino-8-naphthol-3,6-disulfonic acid. After prolonged stirring the solution is acidified with acetic acid, precipitated with sodium chloride and filtered with suction. The azo compound which is recrystallized from methanol is a dark brown powder which is soluble in dilute hydrochloric acid with yellow red, in caustic soda solution with violet red coloration.

Example 8.—Through the heated solution of 2-amino-4-hydroxy-hydrazobenzene-5-sulfonic acid-4'-sulfonic acid amide acidified with dilute acetic acid a current of air is passed until the first colorless solution shows a strongly olive coloration and no further deepening of the color occurs. By the addition of hydrochloric acid and sodium chloride the 2-amino-4-hydroxyazobenzene-5-sulfonic acid-4'-sulfonic acid amide is obtained as an olive-green colored powder which is readily soluble in water with an olive green, in sodium carbonate solution with orange yellow coloration.

Example 9.—20.8 grams of the hydrochloride of the 4-aminobenzenesulfonic acid amide are diazotized in the manner above specified and treated with a soda alkaline solution of 26.9 grams of 6-nitro-2-naphthol-8-sulfonic acid (compare Annalen 323 (1902), page 122). From the intensely brown red solution the azo compound is precipitated by means of dilute hydrochloric acid. It is purified by redissolving from sodium carbonate solution and by precipitation with hydrochloric acid. After filtering with suction and washing with sodium chloride solution 50 grams of the 6-nitro-2-naphthol-8-sulfonic acid-azophenyl-4'-sulfonic acid amide are dissolved in 300 ccs. of alcohol and 150 ccs. of 20% aqueous ammonia. Into this solution which is heated on the water bath while stirring a concentrated aqueous solution of 200 grams of ferrous sulfate are introduced. Thereby the color of the reaction liquid becomes darker. After about 45 minutes the reaction mixture is sucked off from the iron sludge. After cooling the 6-amino-2-naphthol-8-sulfonic acid-azophenyl-4'-sulfonic acid amide is obtained as a red brown precipitate by means of hydrochloric acid.

Example 10.—22.7 grams of the hydrochloride of the 4-aminobenzene-sulfonic acid chloride are diazotized with 7 grams of sodium nitrite while cooling well and treated with a hydrochloric acid solution of 29.5 grams of 2-diethylamino-5-naphthol-7-sulfonic acid. By the addition of sodium acetate coupling occurs and the dyestuff separates as red brown precipitate. The latter is filtered with suction, washed with sodium chloride solution and poured into aqueous ammonia while stirring. The carmine red solution is heated for 30 minutes to 80° C. and acidified after cooling with acetic acid. After the addition of sodium chloride the 2-diethylamino-5-naphthol-7-sulfonic acid-azophenyl-4'-sulfonic acid amide separates as dark red precipitate which is readily soluble in alkalies with brown red coloration.

Example 11.—32.4 grams of 1-nitroso-2-diethylamino-5-naphthol-7-sulfonic acid (obtained by treating 2-diethylamino-5-naphthol-7-sulfonic acid in concentrated hydrochloric acid with nitrous acid) are dissolved in acetic acid and heated with 20 grams of 4-aminobenzene sulfonic acid-dimethylamide in 50 ccs. of acetic acid on the water bath for about 30 minutes. A carmine red solution is formed from which after cooling by the addition of water and sodium chloride the dyestuff is precipitated. The dyestuff is dissolved in hot water and separated with sodium chloride. Also by redissolving from methyl alcohol the 2-diethylamino-5-naphthol-7-sulfonic acid-azophenyl-4'-sulfonic acid dimethylamide may be obtained in the form of a carmine red powder.

Example 12.—20.8 grams of 4-aminobenzene sulfonic acid diethylamide are diazotized in hydrochloric acid solution and coupled with 38.5 grams of the sodium salt of 1-N-hydroxyethylamino-8-naphthol-3,6-disulfonic acid in soda alkaline solution. The 1-N-hydroxyethylamino-8-naphthol-3,6-disulfonic acid-azophenyl-4'-sulfonic acid diethylamide formed is precipitated from the intensely red solution by means of glacial acetic acid and sodium chloride in the form of a red readily soluble crystal powder.

When using instead of 4-aminobenzene-sulfonic acid diethylamide the 4-aminobenzene-sulfonic acid piperidide or pyrrolidide azo compounds of similar properties are obtained.

Example 13.—17.2 grams of 4-aminobenzene-sulfonic acid amide are dissolved in 25 ccs. of concentrated hydrochloric acid and water and diazotized with 6.9 grams of sodium nitrite. The diazo solution is mixed with a solution of 19.4 grams of 4-acetamino-2-aminobenzoic acid in 15 ccs. of concentrated hydrochloric acid. 20 grams of solid sodium acetate are gradually introduced while stirring. Thereby the 4'-sulfonic acid amide-phenylazo-4-acetamino-2-aminobenzoic acid separates as a brown crystalline precipitate which is increased by the addition of sodium chloride solution. The dyestuff which has been filtered with suction and pressed off is dissolved in dilute sodium carbonate solution and slightly acidified with dilute hydrochloric acid whereupon it is separated as an ocher yellow precipitate. It dissolves in caustic soda solution and sodium carbonate solution with yellow coloration. It is slightly soluble in 30% acetic acid when cold, and dissolves with a yellow coloration when heated. Concentrated hydrochloric acid and concentrated sulfuric acid take up the dyestuff with a reddish brown coloration.

10 grams of the dyestuff are heated to boiling with 50 ccs. of hydrochloric acid (spec. gravity 1.08) for half an hour while stirring. After cooling the precipitate is filtered with suction, dissolved in sodium carbonate solution and the solution slowly acidified with 5% acetic acid while stirring. The 4'-sulfonic acid amide-phenylazo-2,4-diamino-1-benzoic acid is separated as violet brown precipitate which dissolves in caustic soda solution with a reddish yellow, in sodium carbonate solution with a brownish yellow coloration. It is only slightly soluble in 30% acetic acid when cold, when heated the dyestuff dissolves with reddish yellow coloration. Concentrated hydrochloric acid takes up the dyestuff with a rose-red, concentrated sulfuric acid with brownish red coloration.

*Example 14.*—40.0 grams of 4-aminobenzene-sulfonic acid-dimethylamide are dissolved in 50 ccs. of concentrated hydrochloric acid and water and diazotized with 13.8 grams of sodium nitrite. 33.4 grams of 3-aminophenoxy-acetic acid in 25 ccs. of concentrated hydrochloric acid and water are added to the diazo solution and for completing the coupling crystallized sodium acetate is introduced while stirring. The 4'-sulfonic acid dimethylamide-phenylazo-3-aminophenoxyacetic acid separates in the form of orange colored crystals decomposing at 230° C. which dissolve in dilute sodium carbonate solution and caustic soda solution with orange red coloration. With concentrated caustic soda solution the sodium salt is obtained from these solutions as a brownish precipitate.

A similar dyestuff is obtained when using instead of 40.0 grams of 4-aminobenzenesulfonic acid-dimethylamide 61.4 grams of aminobenzene-3,5-bis(sulfonic acid-dimethylamide).

This is a continuation-in-part of our copending application Serial No. 15,696, filed April 10, 1935.

We claim:—

1. Azo compounds of the general formula:

wherein R¹ stands for a cyclic radical selected from the group consisting of radicals of the benzene series containing a sulfamide group in the para-position to the azo group and of disulfamide substituted radicals of the benzene series and of the corresponding N-alkyl and N-alkylene substituted products both free valences of the alkylene radical being attached to the nitrogen atom, which radicals are free from acid groups, and wherein R² stands for a cyclic radical containing nitrogen selected from the group consisting of aminobenzene and aminonaphthalene radicals and their N-acyl derivatives, which radicals contain at least one further substituent selected from the group consisting of amino, alkylamino and hydroxyl groups and further contain at least one acid radical which is bound to the cyclic radical by a member selected from the group consisting of nuclear carbon atoms, oxygen atoms, amino-, alkylamino- and alkylene groups, which azo compounds are in the form of their alkali and alkaline-earth metal-, ammonium- and amine salts in general soluble in water.

2. Azo compounds of the general formula:

wherein R¹ stands for a benzene radical which contains a sulfamide group in the para-position to the azo group and is free from acid groups, and wherein R² stands for a cyclic radical containing nitrogen selected from the group consisting of aminobenzene and aminonaphthalene radicals and their N-acyl derivatives, which radicals contain at least one further substituent selected from the group consisting of amino, alkylamino and hydroxyl groups and further contain at least one acid radical which is bound to the cyclic radical by a member selected from the group consisting of nuclear carbon atoms, oxygen atoms, amino-, alkylamino- and alkylene groups, which azo compounds are in the form of their alkali and alkaline-earth metal-, ammonium- and amine salts in general soluble in water.

3. Azo compounds of the general formula:

wherein R¹ stands for a cyclic radical selected from the group consisting of radicals of the benzene series containing a sulfamide group in the para-position to the azo group and of disulfamide substituted radicals of the benzene series and of the corresponding N-alkyl and N-alkylene substituted products both free valences of the alkylene radical being attached to the nitrogen atom, which radicals are free from acid groups, and wherein R² stands for an aminonaphthalene radical (including the N-acylated radicals) which contains at least one further substituent selected from the group consisting of amino, alkylamino and hydroxyl groups and further contains at least one acid radical which is bound to the aminonaphthalene radical by a member selected from the group consisting of nuclear carbon atoms, oxygen atoms, amino-, alkylamino- and alkylene groups, which azo compounds are in the form of their alkali and alkaline-earth metal-, ammonium- and amine salts in general soluble in water.

4. Azo compounds of the general formula:

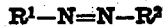

wherein R¹ stands for a benzene radical which contains a sulfamide group in the para-position to the azo group and is free from acid groups, and wherein R² stands for an amino-naphthalene radical (including the N-acylated radicals) which contains at least one further substituent selected from the group consisting of amino, alkylamino and hydroxyl groups and further contains at least one acid radical which is bound to the aminonaphthalene radical by a member selected from the group consisting of nuclear carbon atoms, oxygen atoms, amino-, alkylamino- and alkylene groups, which azo compounds are in the form of their alkali- and alkaline-earth metal-, ammonium- and amine salts in general soluble in water.

5. Azo compounds of the general formula:

wherein R¹ stands for a benzene radical which contains a sulfamide group in the para-position to the azo group and is free from acid groups, and R² stands for an aminonaphthalene radical (including the N-acylated radicals) substituted by a hydroxyl group and at least one sulfo group, which azo compounds are in the form of their alkali- and alkaline-earth metal-, ammonium and amine salts in general soluble in water.

6. Azo compounds of the general formula, $$R^1-N=N-R^2$$

wherein $R^1$ stands for a cyclic radical selected from the group consisting of radicals of the benzene series containing a sulfamide group in the para-position to the azo group and of disulfamide substituted radicals of the benzene series which radicals are free from acid groups, and $R^2$ stands for an aminobenzene radical which contains at least one further substituent selected from the group consisting of amino, alkylamino and hydroxyl groups and further contains at least one acid radical which is bound to the aminobenzene radical by a member selected from the group consisting of nuclear carbon atoms, oxygen atoms, amino-, alkylamino- and alkylene groups, which azo compounds are in the form of their alkali- and alkaline-earth metal-, ammonium and amine salts in general soluble in water.

7. Azo compounds of the general formula:

$$R^1-N=N-R^2$$

wherein $R^1$ stands for a cyclic radical selected from the group consisting of radicals of the benzene series containing a sulfamide group in the para-position to the azo group and of disulfamide substituted radicals of the benzene series which are free from acid groups, and $R^2$ stands for an aminophenol radical substituted by at least one acid radical, which azo compounds are in the form of their alkali- and alkaline-earth metal-, ammonium and amine salts in general soluble in water.

8. Azo compounds of the general formua:

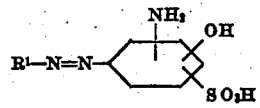

wherein $R^1$ stands for a benzene radical which contains a sulfamide group in the para-position to the azo group and is free from acid groups, which azo compounds are in the form of their alkali- and alkaline-earth metal-, ammonium and amine salts in general soluble in water.

9. Azo compounds of the general formula:

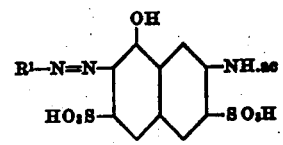

wherein $R^1$ stands for a benzene radical which contains a sulfamide group in the para-position to the azo group and is free from acid groups, and ac stands for an acyl group, which azo compounds are in the form of their alkali and alkaline-earth metal-, ammonium and amine salts soluble in water.

10. The azo compound of the formula:

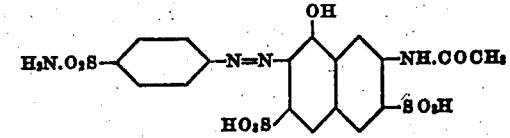

which is in the form of its alkali and alkaline-earth metal, ammonium and amine salts soluble in water.

11. Azo compounds of the general formula:

$$R^1-N=N-R^2$$

wherein $R^1$ stands for a benzene radical which contains a sulfamide group in the para-position to the azo group and is free from acid groups, and $R^2$ stands for an aminobenzene radical (including the N-acylated radicals) which contains at least one further substituent selected from the group consisting of amino-, alkylamino- and hydroxyl groups and further contains at least one carboxylic acid radical which is bound to the aminobenzene radical by a member selected from the group consisting of nuclear carbon atoms, oxygen atoms, amino-, alkylamino- and alkylene groups, which azo compounds are in the form of their alkali and alkaline-earth metal-, ammonium and amine salts soluble in water.

FRITZ MIETZSCH.
JOSEF KLARER.